(12) United States Patent
Nakamura et al.

(10) Patent No.: US 11,827,492 B2
(45) Date of Patent: Nov. 28, 2023

(54) MOVING HANDRAIL AND METHOD OF MANUFACTURING MOVING HANDRAIL

(71) Applicant: Mitsubishi Electric Corporation, Tokyo (JP)

(72) Inventors: Ryuma Nakamura, Tokyo (JP); Yoshitomo Nishimura, Tokyo (JP); Hidetoshi Takeyama, Tokyo (JP); Masashi Hara, Tokyo (JP); Samito Nozue, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 204 days.

(21) Appl. No.: 17/614,131

(22) PCT Filed: Mar. 4, 2020

(86) PCT No.: PCT/JP2020/009148
§ 371 (c)(1),
(2) Date: Nov. 24, 2021

(87) PCT Pub. No.: WO2020/246086
PCT Pub. Date: Dec. 10, 2020

(65) Prior Publication Data
US 2022/0250876 A1    Aug. 11, 2022

(30) Foreign Application Priority Data
Jun. 3, 2019    (JP) .................................. 2019-103561

(51) Int. Cl.
*B66B 23/24*    (2006.01)
*B29C 65/02*    (2006.01)
(Continued)

(52) U.S. Cl.
CPC .............. *B66B 23/24* (2013.01); *B29C 65/02* (2013.01); *B29C 66/43* (2013.01); *B29C 66/729* (2013.01); *B29K 2667/00* (2013.01)

(58) Field of Classification Search
CPC ......... B66B 23/24; B29C 65/02; B29C 66/43; B29C 66/729; B29K 2667/00
(Continued)

(56) References Cited

U.S. PATENT DOCUMENTS 4,618,387 A * 10/1986 Fisher ................. B29C 66/1142
156/244.11
6,237,740 B1 * 5/2001 Weatherall .............. B66B 23/24
198/337

(Continued)

FOREIGN PATENT DOCUMENTS

JP    2012046269 A    3/2012
JP    2012106821 A    6/2012
(Continued)

OTHER PUBLICATIONS

International Search Report (PCT/ISA/210) with translation and Written Opinion (PCT/ISA/237) dated May 26, 2020, by the Japan Patent Office as the International Searching Authority for International Application No. PCT/JP2020/009148. (8 pages).

*Primary Examiner* — Leslie A Nicholson, III
(74) *Attorney, Agent, or Firm* — BUCHANAN INGERSOLL & ROONEY PC

(57) ABSTRACT

Provided is a moving handrail that can lengthen its lifetime. The moving handrail includes: a handrail main body portion; a fabric arranged on a guide surface of the handrail main body portion and extending in a handrail longitudinal direction; and a resin sheet arranged on the fabric so that the fabric is sandwiched between the handrail main body portion and the resin sheet, wherein a surface of the fabric facing a handrail guide has arranged thereon an end portion (Continued)

of the fabric in the handrail longitudinal direction, and wherein the end portion of the fabric in the handrail longitudinal direction is covered with the resin sheet.

9 Claims, 13 Drawing Sheets

(51) Int. Cl.
*B29C 65/00* (2006.01)
*B29K 667/00* (2006.01)

(58) Field of Classification Search
USPC .................................................. 198/335, 337
See application file for complete search history.

(56) References Cited

U.S. PATENT DOCUMENTS

| | | | | |
|---|---|---|---|---|
| 6,761,259 B1 * | 7/2004 | Onodera | ................. | B66B 23/24 198/337 |
| 8,038,818 B2 * | 10/2011 | Murata | ............. | B29C 66/91221 156/304.6 |
| 9,290,360 B2 * | 3/2016 | Takeyama | ................ | B66B 21/02 |
| 9,481,552 B2 * | 11/2016 | Kawasaki | ................ | B66B 23/24 |
| 10,124,992 B2 * | 11/2018 | Takeyama | ......... | B29C 66/02241 |
| 10,160,623 B2 * | 12/2018 | Kenny | .................... | B32B 27/12 |
| 2015/0210512 A1 * | 7/2015 | Kawasaki | ............... | B66B 23/24 156/583.1 |
| 2015/0336774 A1 | 11/2015 | Takeyama et al. | | |
| 2017/0166420 A1 | 6/2017 | Takeyama et al. | | |

FOREIGN PATENT DOCUMENTS

| | | |
|---|---|---|
| WO | 2014175051 A1 | 10/2014 |
| WO | 2015182739 A1 | 12/2015 |
| WO | 2018078917 A1 | 5/2018 |

* cited by examiner

MOVING HANDRAIL AND METHOD OF MANUFACTURING MOVING HANDRAIL

TECHNICAL FIELD

The present invention relates to a moving handrail and a method of manufacturing the moving handrail.

BACKGROUND ART

There has heretofore been known a moving handrail including: a handrail main body portion; and a fabric arranged on a guide surface of the handrail main body portion and extending in a handrail longitudinal direction that is a direction along the handrail main body portion, the moving handrail being formed in an endless shape (see, for example, Patent Literature 1).

CITATION LIST

Patent Literature

[PTL 1] WO 2018/078917 A1
[PTL 2] WO 2014/175051 A1

SUMMARY OF INVENTION

Technical Problem

However, the moving handrail is manufactured by joining both the end portions in a longitudinal direction of one elongated member for a moving handrail to each other. Accordingly, a surface of the fabric facing a handrail guide has formed thereon a boundary portion in which the end portion of the fabric in the longitudinal direction of the handrail main body portion is arranged. When the moving handrail performs circulation movement, a driving member configured to cause the moving handrail to perform the circulation movement is brought into contact with the boundary portion. When the end portion of the fabric arranged in the boundary portion hitches on the driving member, a fray occurs in the end portion of the fabric. As a result, there has been a problem in that the moving handrail deteriorates.

The present invention has been made to solve such problem as described above, and an object of the present invention is to provide a moving handrail that can lengthen its lifetime and a method of manufacturing the moving handrail.

Solution to Problem

According to one embodiment of the present invention, there is provided a moving handrail, including: a handrail main body portion; a fabric arranged on a guide surface of the handrail main body portion and extending in a handrail longitudinal direction that is a direction along the handrail main body portion; and a resin sheet arranged on the fabric so that the fabric is sandwiched between the handrail main body portion and the resin sheet, wherein a surface of the fabric facing a handrail guide has formed thereon a boundary portion in which an end portion of the fabric in the handrail longitudinal direction is arranged, and wherein the boundary portion is covered with the resin sheet.

According to one embodiment of the present invention, there is provided a method of manufacturing a moving handrail, the method including a resin sheet-arranging step of arranging a resin sheet on a fabric arranged on a guide surface of a handrail main body portion and extending in a handrail longitudinal direction that is a direction along the handrail main body portion so that the fabric is sandwiched between the handrail main body portion and the resin sheet, wherein a surface of the fabric facing a handrail guide has formed thereon a boundary portion in which an end portion of the fabric in the handrail longitudinal direction is arranged, and in the resin sheet-arranging step, the boundary portion is covered with the resin sheet.

Advantageous Effects of Invention

According to the moving handrail and the method of manufacturing the moving handrail according to the present invention, the lifetime of the moving handrail can be lengthened.

DESCRIPTION OF EMBODIMENTS

First Embodiment

Figure 1:
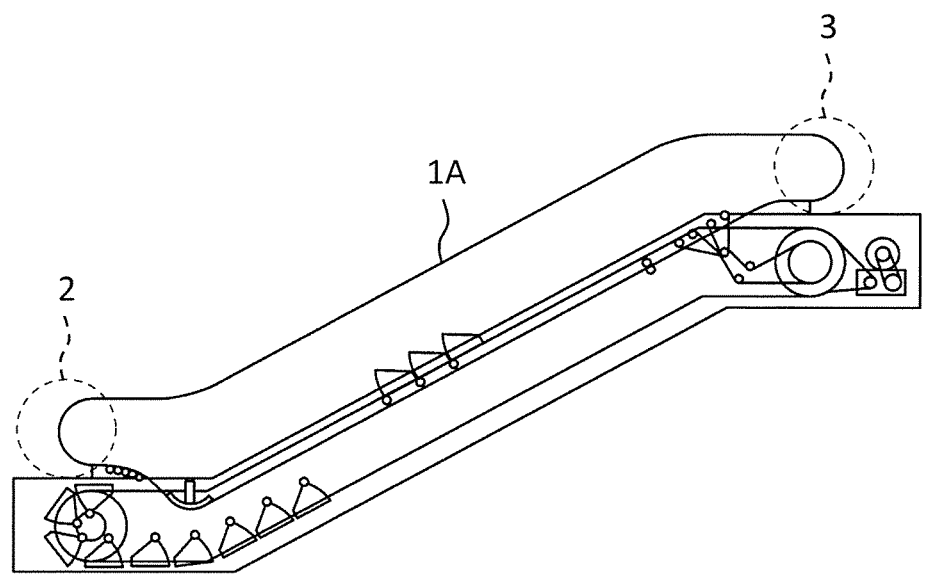
FIG. 1 is a configuration view for illustrating an escalator apparatus including a moving handrail according to a first embodiment of the present invention.

FIG. 1 is a configuration view for illustrating an escalator apparatus including a moving handrail according to a first embodiment of the present invention. A moving handrail 1A is formed in an endless shape. A driving member, such as a sheave or a roller, drives to cause the moving handrail 1A to perform circulation movement. When the moving handrail 1A performs the circulation movement, the moving handrail 1A is reversed in a lower floor-side entrance 2 and an upper floor-side entrance 3 in the escalator apparatus.

Figure 2:
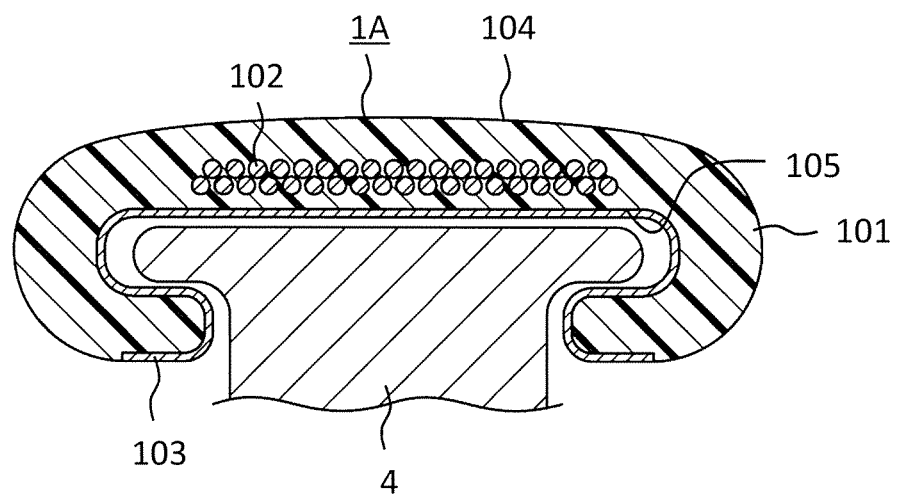
FIG. 2 is a sectional view for illustrating the moving handrail of FIG. 1 and a handrail guide having attached thereto the moving handrail.

FIG. 2 is a sectional view for illustrating the moving handrail 1A of FIG. 1 and a handrail guide having attached thereto the moving handrail 1A. In FIG. 2, a section perpendicular to the longitudinal direction of the moving handrail 1A is illustrated. The moving handrail 1A includes a handrail main body portion 101, a tension member 102, and a fabric 103.

The handrail main body portion 101 is formed in a sectional C shape. The handrail main body portion 101 is formed in an endless shape. A direction along the handrail main body portion 101 is defined as a handrail longitudinal direction. The handrail longitudinal direction is the same as the longitudinal direction of the moving handrail 1A. The outer peripheral surface of the handrail main body portion 101 is defined as a design surface 104. The inner peripheral surface of the handrail main body portion 101 is defined as a guide surface 105. The guide surface 105 is a surface of the handrail main body portion 101 facing a handrail guide 4. The design surface 104 is a surface to be touched with a hand of a user of the escalator apparatus. The fabric 103 is arranged on the guide surface 105. The guide surface 105 moves along the handrail guide 4. The handrail main body portion 101 is attached to the handrail guide 4 so that the handrail main body portion 101 covers the surface of the handrail guide 4. The handrail main body portion 101 includes: a flat plate portion facing the handrail guide 4 in a height direction; and a pair of ear portions configured to sandwich the handrail guide 4 in the width direction of the moving handrail 1A.

An example of a material for forming the handrail main body portion 101 is a single thermoplastic elastomer, such as a polyurethane-, polystyrene-, or polyolefin-based thermoplastic elastomer. Another example of the material for forming the handrail main body portion 101 is a thermoplastic elastomer obtained by mixing two or more kinds of the single thermoplastic elastomers, such as the polyurethane-, polystyrene-, and polyolefin-based thermoplastic elastomers.

The tension member 102 is embedded in the handrail main body portion 101. The tension member 102 is arranged so as to extend in the handrail longitudinal direction. Thus, a tensile strength and a bending strength in the moving handrail LA satisfy required strengths. Examples of a material for forming the tension member 102 include a metal plate and a plurality of steel cables.

Examples of a material for forming the fabric 103 include fibers, such as cotton and hemp. Another example of the material for forming the fabric 103 is a resin, such as polyester. Thus, a coefficient of friction in the surface of the fabric 103 becomes smaller. The fabric 103 is attached to the guide surface 105 so that the fabric 103 covers the guide surface 105. When the moving handrail 1A performs the circulation movement, the fabric 103 attached to the guide surface 105 moves with respect to the surface of the handrail guide 4.

Figure 3:
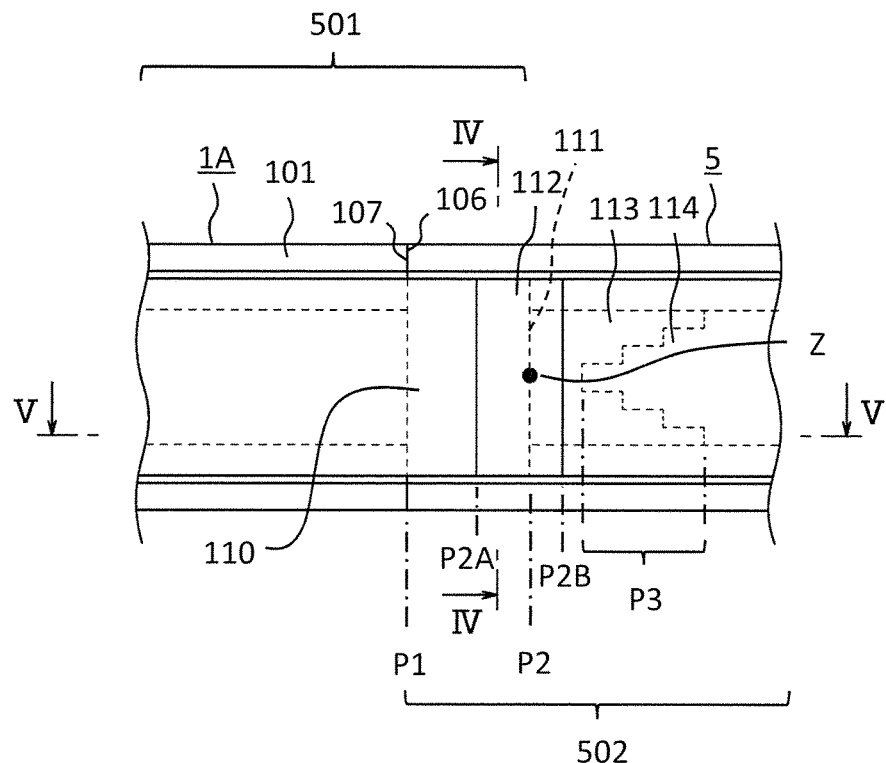
FIG. 3 is a bottom view for illustrating the moving handrail of FIG. 2.
Figure 4:
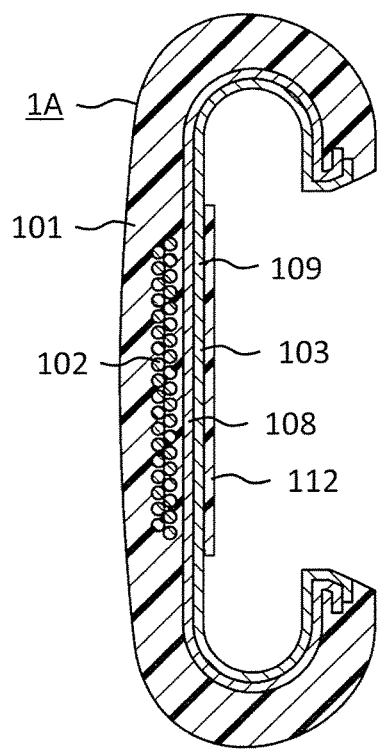
FIG. 4 is a sectional view taken along the line IV-IV of FIG. 3 and viewed from the direction indicated by the arrows.
Figure 5:
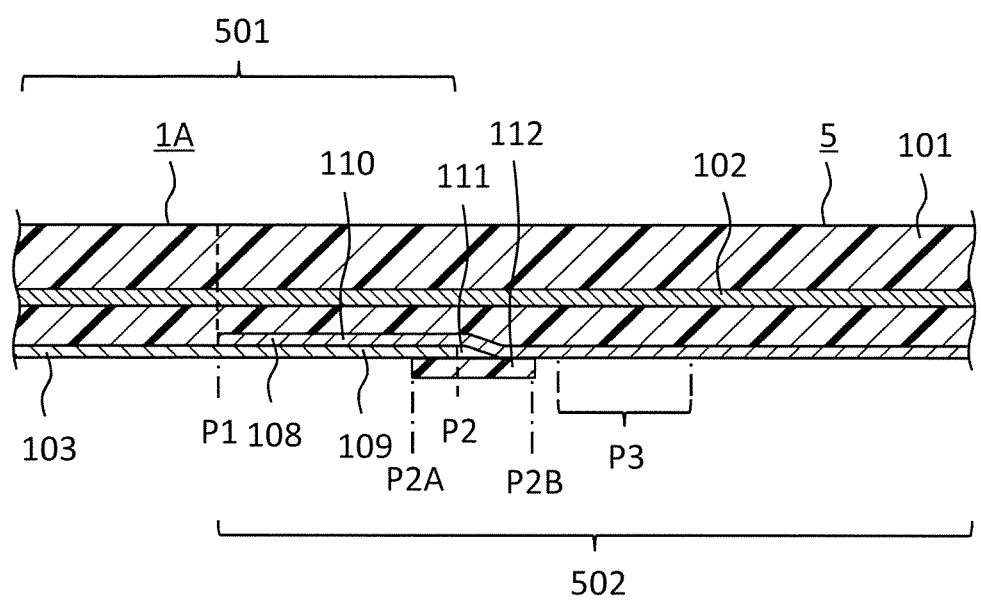
FIG. 5 is a sectional view taken along the line V-V of FIG. 3 and viewed from the direction indicated by the arrows.

The moving handrail 1A is manufactured by joining one end portion in a longitudinal direction and the other end portion in the longitudinal direction of one elongated member for a moving handrail to each other. Next, the joining portions of the moving handrail 1A are described. FIG. 3 is a bottom view for illustrating the moving handrail 1A of FIG. 2. FIG. 4 is a sectional view taken along the line IV-IV of FIG. 3 and viewed from the direction indicated by the arrows. FIG. 5 is a sectional view taken along the line V-V of FIG. 3 and viewed from the direction indicated by the arrows. The joining portions of the moving handrail 1A include the joining portion of the handrail main body portion 101, the joining portion of the tension member 102, and the joining portion of the fabric 103. The joining portion of the handrail main body portion 101 is represented by P1, the joining portion of the fabric 103 is represented by P2, and the joining portion of the tension member 102 is represented by P3.

In the joining portion P1, the joining surface 106 of the handrail main body portion 101 arranged in one end portion 501 in a longitudinal direction of an elongated member 5 for a moving handrail and the joining surface 107 of the handrail main body portion 101 arranged in the other end portion 502 in the longitudinal direction of the elongated member 5 for a moving handrail are joined to each other. The joining surface 106 and the joining surface 107 are brought into contact with each other.

The fabric 103 includes: an overlapping target portion 108 arranged in the other end portion 502 in the longitudinal direction of the elongated member 5 for a moving handrail; and an overlapping portion 109 arranged in the one end portion 501 in the longitudinal direction of the elongated member 5 for a moving handrail. The overlapping portion 109 is caused to overlap a surface of the overlapping target portion 108 on the handrail guide 4 side. The overlapping portion 109 and the overlapping target portion 108 are joined to each other via an adhesive. A region of the fabric 103 where the overlapping portion 109 and the overlapping target portion 108 are caused to overlap each other is defined as an overlapping region 110.

In each of the joining portions of the moving handrail 1A according to the first embodiment, a rigidity ratio between the non-joining portion and joining portion of the moving handrail 1A approaches 1 as compared to the joining portion of a related-art moving handrail described in Patent Literature 2. As a result, when the moving handrail 1A is caused to travel, contact between the moving handrail 1A and a part for forming an escalator becomes smooth, and hence the following effect is obtained: a surface resin on a design side derived from the rigidity ratio between the non-joining portion and joining portion of the moving handrail 1A can be suppressed from being flawed.

The position of the end portion of the overlapping portion 109 in the handrail longitudinal direction is the position of the joining portion P2 in the handrail longitudinal direction. A surface of the fabric 103 facing the handrail guide 4 has formed thereon a boundary portion 111 in which the end portion of the fabric 103 in the handrail longitudinal direction is arranged. In other words, the surface of the fabric 103 facing the handrail guide 4 has arranged thereon the end portion of the fabric 103 in the handrail longitudinal direction. The boundary portion 111 refers to a gap formed between the end portion of the fabric 103 and the starting point of the overlapping target portion 108 of a fabric for forming the overlapping target portion 108. The boundary portion 111 is a space to be filled with part of a resin sheet 112 by a hot pressing step. The boundary portion 111 is an intermediate product formed before the hot pressing step. Accordingly, the boundary portion 111 has arranged therein the end portion of the overlapping portion 109 in the handrail longitudinal direction. In other words, the end portion of the fabric 103 in the handrail longitudinal direction is the end portion of the overlapping portion 109 in the handrail longitudinal direction. The position of the end portion of the overlapping target portion 108 in the handrail longitudinal direction is the position of the joining portion P1 in the handrail longitudinal direction.

The fabric 103 includes a nonwoven fabric or a woven fabric. The woven fabric is formed by subjecting a twisted yarn or a single yarn to plain weaving or twill weaving. Accordingly, in a cut surface of the fabric 103, the end portion of the fabric or the yarn is exposed irrespective of a cutting method. When the moving handrail 1A performs the circulation movement under a state in which the end portion of the fabric 103 is exposed, the end portion of the fabric 103 is brought into contact with the driving member configured to cause the moving handrail 1A to perform the circulation movement. Thus, a fray occurs in the end portion of the fabric 103. When the fray occurs, a portion of the fabric 103 where the fray has occurred serves as a starting point for the overlapping portion 109 to peel from the overlapping target portion 108. When the overlapping portion 109 peels from the overlapping target portion 108, the moving handrail 1A deteriorates.

Accordingly, in the first embodiment, the moving handrail 1A further includes the resin sheet 112. The resin sheet 112 is arranged on the fabric 103 so that the fabric 103 is sandwiched between the resin sheet 112 and the handrail main body portion 101. The resin sheet 112 covers the boundary portion 111. Thus, the end portion of the fabric 103 is prevented from being brought into contact with the driving member configured to cause the moving handrail 1A to perform the circulation movement.

The end portion of the tension member 102 arranged in the one end portion 501 in the longitudinal direction has formed therein a concave-shaped step portion 113. The shape of the step portion 113 is a concave shape when viewed perpendicularly to the tension member 102. The end portion of the tension member 102 arranged in the other end portion 502 in the longitudinal direction has formed therein a convex-shaped step portion 114. The shape of the step portion 114 is a convex shape when viewed perpendicularly to the tension member 102. In the joining portion P3, the step portion 113 and the step portion 114 are joined to each other under a state in which the step portion 113 and the step portion 114 are fit into each other.

Next, the shape of the resin sheet 112 is described. The shape of the resin sheet 112 to be described here is an example, and any other shape may be adopted. The position of one end portion of the resin sheet 112 in the handrail longitudinal direction is represented by P2A, and the position of the other end portion of the resin sheet 112 in the handrail longitudinal direction is represented by P2B. The joining portion P2 is arranged at a center between the position P2A and the position P2B in the handrail longitudinal direction. A distance between the position P2A and the position P2B in the handrail longitudinal direction is from 1 mm to 100 mm. With regard to the positions of the position P2A and the position P2B, the joining portion P2 only needs to be arranged between the position P2A and the position P2B in the handrail longitudinal direction, and the joining portion P2 may not be arranged at the center between the position P2A and the position P2B in the handrail longitudinal direction.

Each of the one end portion and other end portion of the resin sheet 112 in the handrail longitudinal direction is formed so as to linearly extend in the width direction of the moving handrail 1A. Each of the one end portion and other end portion of the resin sheet 112 in the handrail longitudinal direction may not linearly extend in the width direction of the moving handrail 1A.

The middle point of the joining portion P2 in the width direction of the moving handrail 1A is represented by Z. The middle point Z is a point that the resin sheet 112 should cover at least. It is desired that a distance between the middle point Z and each of both the end portions of the resin sheet 112 in the width direction of the moving handrail 1A be 1 mm or more, and be equal to or less than a distance from the middle point Z to each of a pair of inflection points in the handrail main body portion 101 of a sectional C shape. The distance between the middle point Z and each of both the end portions of the resin sheet 112 in the width direction of the moving handrail 1A desirably falls within the range of, for example, from 10 mm to 35 mm, though the desired value varies depending on the shape of the moving handrail 1A. The size of the resin sheet 112 in its thickness direction is desirably from 0.1 mm to 10 mm, more desirably from 0.2 mm to 2 mm. The size of the resin sheet 112 in its thickness direction is smaller than a distance between the fabric 103 and the handrail guide 4. In a portion having a large curvature of the moving handrail 1A formed in a sectional C shape, the fabric 103 and the handrail guide 4 are brought into contact with each other. Meanwhile, in a portion near the width-direction center of the transfer surface of the moving handrail 1A, a gap is formed between the fabric 103 and the handrail guide 4. When the moving handrail 1A moves while the fabric 103 and the handrail guide 4 in the portion near the width-direction center of the transfer surface of the moving handrail 1A are always in contact with each other, a reduction in sliding performance of the moving handrail 1A with respect to the handrail guide 4 occurs, and abrasion occurs between the fabric 103 and the handrail guide 4. Accordingly, the size of the resin sheet 112 in its thickness direction needs to be made smaller than the distance between the fabric 103 and the handrail guide 4. The distance between the fabric 103 and the handrail guide 4 in this case is a distance between the fabric 103 and the handrail guide 4 in the portion near the width-direction center of the transfer surface of the moving handrail 1A.

A material for forming the resin sheet 112 is identical to the material for forming the handrail main body portion 101. The material for forming the resin sheet 112 may be different from the material for forming the handrail main body portion 101. An example of the material for forming the resin sheet 112 is a single thermoplastic elastomer, such as a polyurethane-, polystyrene-, or polyolefin-based thermoplastic elastomer. Another example of the material for forming the resin sheet 112 is a thermoplastic elastomer obtained by mixing two or more kinds of the single thermoplastic elastomers, such as the polyurethane-, polystyrene-, and polyolefin-based thermoplastic elastomers.

Figure 6:
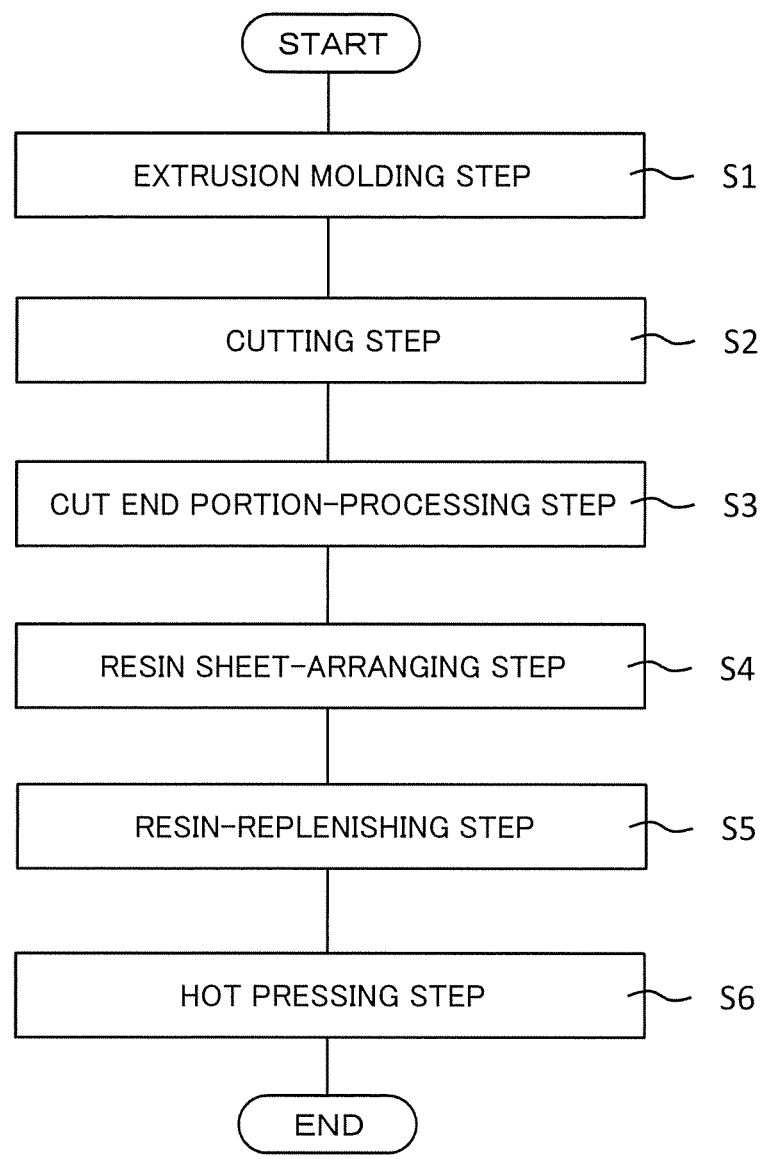
FIG. 6 is a flow chart for illustrating a method of manufacturing the moving handrail of FIG. 1.

Next, a method of manufacturing the moving handrail LA is described. FIG. 6 is a flow chart for illustrating the method of manufacturing the moving handrail 1A of FIG. 1. First, an extrusion molding step is performed in Step S1. In the extrusion molding step, the elongated member 5 for a moving handrail is formed. In the extrusion molding step, first, the tension member 102 and the fabric 103 are arranged on the insert line of an extrusion molding machine (not shown). The tension member 102 is arranged at a position to be embedded in a thermoplastic elastomer. The fabric 103 is arranged at the position at which the guide surface 105 is formed.

After that, the thermoplastic elastomer is loaded into the mold of the extrusion molding machine, and the handrail main body portion 101 is extruded together with the tension member 102 and the fabric 103.

After that, the elongated member 5 for a moving handrail that has been continuously molded is cooled by a medium, such as water or air, and is then wound around a core for primary storage.

After that, a cutting step is performed in Step S2. In the cutting step, the elongated member 5 for a moving handrail wound around the core for primary storage is cut into a length appropriate for the use of the final product. A cut surface of the elongated member 5 for a moving handrail thus cut is the same as the section of the moving handrail 1A illustrated in FIG. 2. The extrusion molding step is an example, and the extrusion molding step may be performed by any other method.

Figure 7:
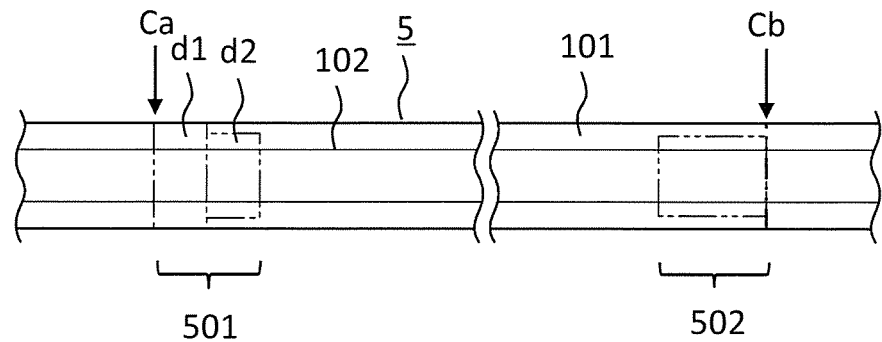
FIG. 7 is a plan view for illustrating an elongated member for a moving handrail molded in the extrusion molding step of FIG. 6.

FIG. 7 is a plan view for illustrating the elongated member 5 for a moving handrail molded in the extrusion molding step of FIG. 6. In Step S2, the elongated member 5 for a moving handrail is cut into a length appropriate for the use of the escalator apparatus. The position of one end portion of the elongated member 5 for a moving handrail in the handrail longitudinal direction is represented by Ca, and the position of the other end portion thereof is represented by Cb. In this example, a configuration in which both the end portions of the elongated member 5 for a moving handrail in the handrail longitudinal direction are cut is described. However, when one of both the end portions of the elongated member 5 for a moving handrail in the handrail longitudinal direction has already been cut, only the other is cut in the cutting step.

After that, a cut end portion-processing step is performed in Step S3. In the cut end portion-processing step, the one end portion 501 in the longitudinal direction of the elongated member 5 for a moving handrail is molded, and the other end portion 502 in the longitudinal direction of the elongated member 5 for a moving handrail is molded. The order in which the one end portion 501 in the longitudinal direction and the other end portion 502 in the longitudinal direction are molded may be any one of: a case in which the one end portion 501 in the longitudinal direction is molded first, and then the other end portion 502 in the longitudinal direction is molded; and a case in which the other end portion 502 in the longitudinal direction is molded first, and then the one end portion 501 in the longitudinal direction is molded. In addition, with regard to the order in which the one end portion 501 in the longitudinal direction and the other end portion 502 in the longitudinal direction are molded, the one end portion 501 in the longitudinal direction and the other end portion 502 in the longitudinal direction may be simultaneously molded.

Figure 8:
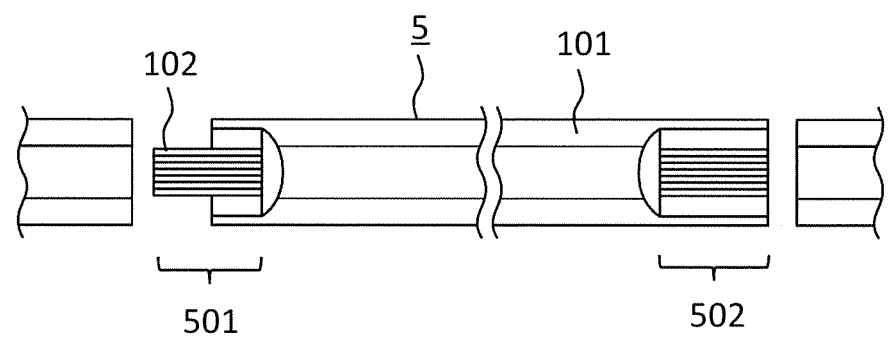
FIG. 8 is a plan view for illustrating the elongated member for a moving handrail having its tension member exposed in one end portion in a longitudinal direction and the other end portion in the longitudinal direction of FIG. 7.

In the molding of the one end portion 501 in the longitudinal direction, in the tip portion d1 of the one end portion 501 in the longitudinal direction, a portion of the handrail main body portion 101 and a portion of the fabric 103 are removed with a heating apparatus, a cutting apparatus, or the like. FIG. 8 is a plan view for illustrating the elongated member 5 for a moving handrail having the tension member 102 exposed in the one end portion 501 in the longitudinal direction and the other end portion 502 in the longitudinal direction of FIG. 7. When the portion of the handrail main body portion 101 and the portion of the fabric 103 are removed in the one end portion 501 in the longitudinal direction, the tension member 102 in the tip portion d1 is exposed.

After that, in the base end portion d2 of the one end portion 501 in the longitudinal direction, a portion of the handrail main body portion 101 arranged on a front side in the elongated member 5 for a moving handrail is removed. Herein, the front side is the design surface 104 side in the moving handrail 1A. Thus, the front side of the tension member 102 in the base end portion d2 is exposed.

After that, in the base end portion d2 of the one end portion 501 in the longitudinal direction, a portion of the handrail main body portion 101 between the tension member 102 and the fabric 103 is removed. Thus, the overlapping portion 109 is formed.

Figure 9:
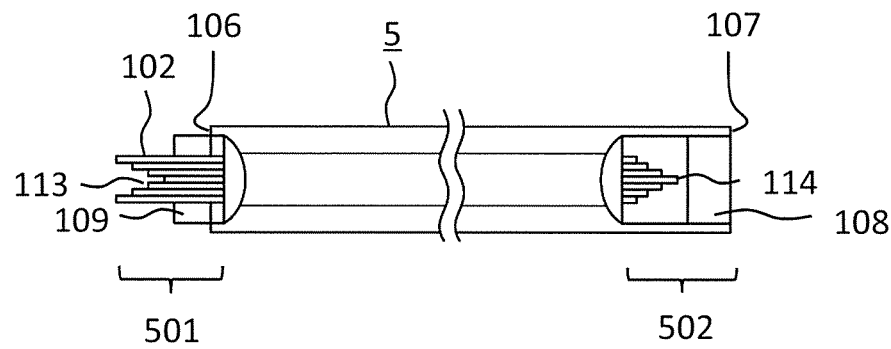
FIG. 9 is a plan view for illustrating the elongated member for a moving handrail having the tension member molded in one end portion in a longitudinal direction and the other end portion in the longitudinal direction of FIG. 8.
Figure 10:
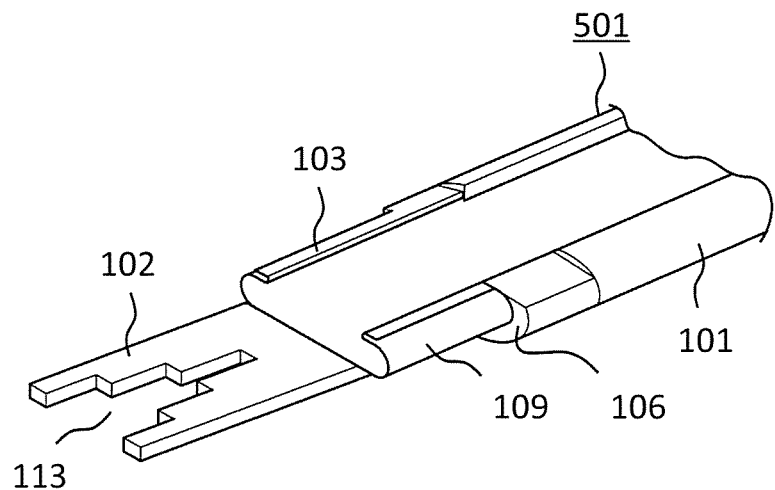
FIG. 10 is a perspective view of one end portion in a longitudinal direction of FIG. 9 viewed from its back side.

After that, a portion of the handrail main body portion 101 in the base end portion d2 of the one end portion 501 in the longitudinal direction is removed, and hence the joining surface 106 is formed. After that, the concave-shaped step portion 113 is formed in the tension member 102 of the one end portion 501 in the longitudinal direction. FIG. 9 is a plan view for illustrating the elongated member 5 for a moving handrail having the tension member 102 molded in the one end portion 501 in the longitudinal direction and the other end portion 502 in the longitudinal direction of FIG. 8. FIG. 10 is a perspective view of the one end portion 501 in the longitudinal direction of FIG. 9 viewed from its back side.

As illustrated in FIG. 8, in the molding of the other end portion 502 in the longitudinal direction, the handrail main body portion 101 arranged on a front side in the other end portion 502 in the longitudinal direction is removed. Thus, the front side of the tension member 102 in the other end portion 502 in the longitudinal direction is exposed.

After that, as illustrated in FIG. 9, the convex-shaped step portion 114 is formed in the tension member 102 in the other end portion 502 in the longitudinal direction. The respective shapes of the step portion 113 and the step portion 114 are shapes to be fit into each other.

After that, the fabric 103 of the other end portion 502 in the longitudinal direction is pressed toward the tension member 102 with a pressurizing apparatus, and hence a concave portion is formed in the fabric 103. Thus, the overlapping target portion 108 is formed. The size of the concave portion of the fabric 103 in its thickness direction is a size obtained by summing: the size of the overlapping portion 109 in its thickness direction; and the size of the adhesive for joining the overlapping portion 109 and the overlapping target portion 108 to each other in its thickness direction.

Figure 11:
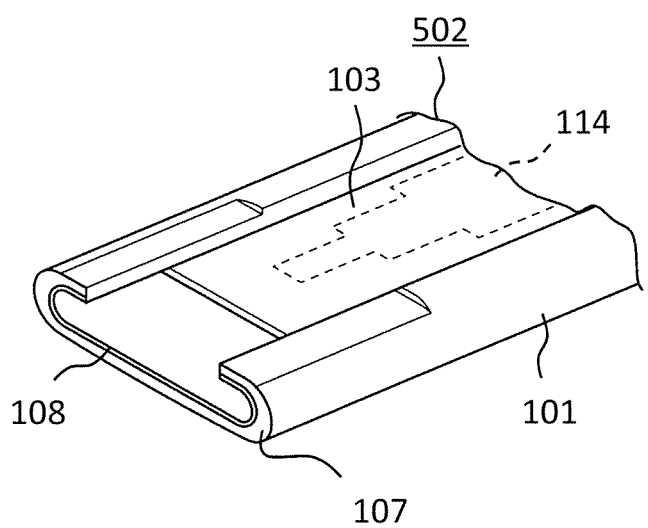
FIG. 11 is a perspective view of the other end portion in the longitudinal direction of FIG. 9 viewed from its back side.

After that, the joining surface 107 is formed in the handrail main body portion 101 in the other end portion 502 in the longitudinal direction. FIG. 11 is a perspective view of the other end portion 502 in the longitudinal direction of FIG. 9 viewed from its back side.

Although a configuration in which the respective shapes of the joining surface 106 and the joining surface 107 are flat surfaces along a surface perpendicular to the handrail longitudinal direction has been described, the present invention is not limited thereto. The respective shapes of the joining surface 106 and the joining surface 107 may be, for example, flat surfaces inclined with respect to the surface perpendicular to the handrail longitudinal direction. In addition, the respective shapes of the joining surface 106 and the joining surface 107 may be concave and convex shapes to be fit into each other.

Figure 12:
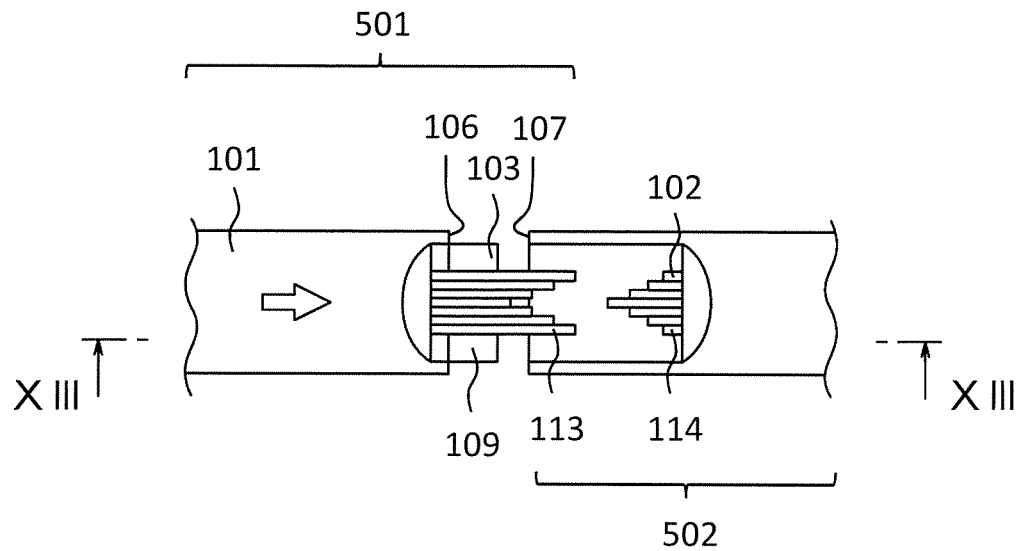
FIG. 12 is a plan view for illustrating the one end portion in the longitudinal direction and the other end portion in the longitudinal direction to be joined to each other after the cut end portion-processing step of FIG. 6.
Figure 13:
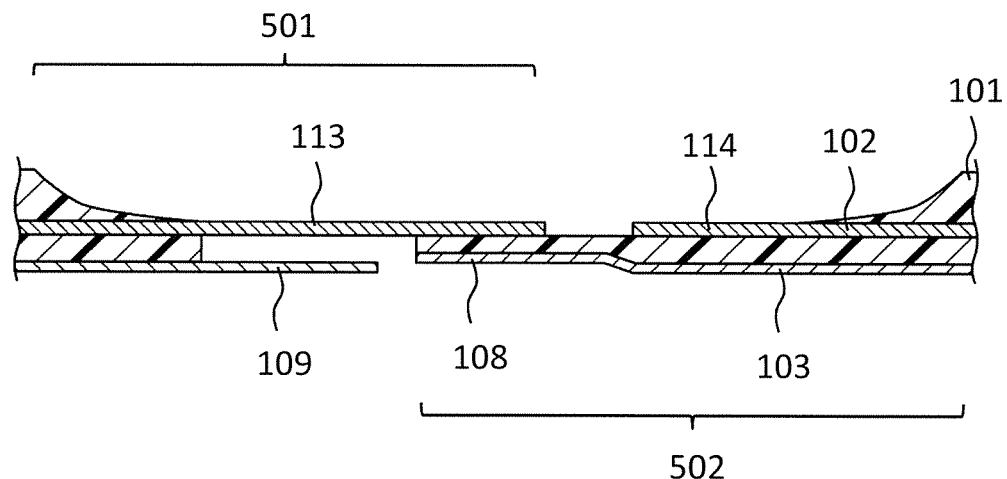
FIG. 13 is a sectional view taken along the line XIII-XIII of FIG. 12 and viewed from the direction indicated by the arrows.
Figure 14:
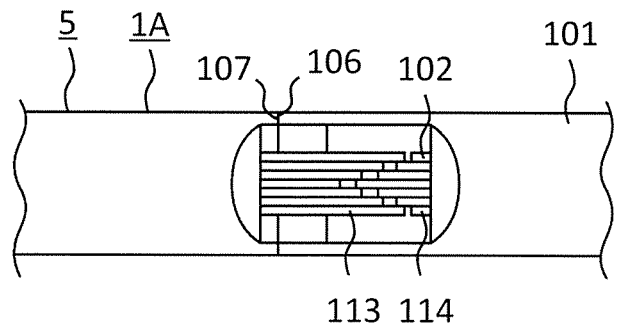
FIG. 14 is a plan view for illustrating a state in which the one end portion in the longitudinal direction and the other end portion in the longitudinal direction of FIG. 12 are brought into contact with each other.

FIG. 12 is a plan view for illustrating the one end portion 501 in the longitudinal direction and the other end portion 502 in the longitudinal direction to be joined to each other after the cut end portion-processing step of FIG. 6. FIG. 13 is a sectional view taken along the line XIII-XIII of FIG. 12 and viewed from the direction indicated by the arrows. FIG. 14 is a plan view for illustrating a state in which the one end portion 501 in the longitudinal direction and the other end portion 502 in the longitudinal direction of FIG. 12 are brought into contact with each other. After that, the elongated member 5 for a moving handrail is curved so that the one end portion 501 in the longitudinal direction and the other end portion 502 in the longitudinal direction face each other in the handrail longitudinal direction, and hence the joining surface 106 and the joining surface 107 are brought into contact with each other. Although the one end portion 501 in the longitudinal direction moves toward the other end portion 502 in the longitudinal direction in this example, the present invention is not limited thereto, and the other end portion 502 in the longitudinal direction may move toward the one end portion 501 in the longitudinal direction. In addition, each of the one end portion 501 in the longitudinal direction and the other end portion 502 in the longitudinal direction may move in such a direction as to approach the other.

After that, the overlapping portion 109 is caused to overlap the overlapping target portion 108, and the overlapping target portion 108 and the overlapping portion 109 are bonded to each other. After that, the step portion 113 and the step portion 114 are fit into each other.

In this example, the following configuration has been described: the joining surface 106 and the joining surface 107 are brought into contact with each other; then, the overlapping portion 109 is caused to overlap the overlapping target portion 108; and then, the step portion 113 and the step portion 114 are fit into each other. However, the order in which those acts are performed may be appropriately changed as required. In addition, the timing at which the adhesive for bonding the overlapping target portion 108 and the overlapping portion 109 to each other is applied may be before the one end portion 501 in the longitudinal direction and the other end portion 502 in the longitudinal direction face each other, or may be after the joining surface 106 and the joining surface 107 have been brought into contact with each other.

Figure 15:
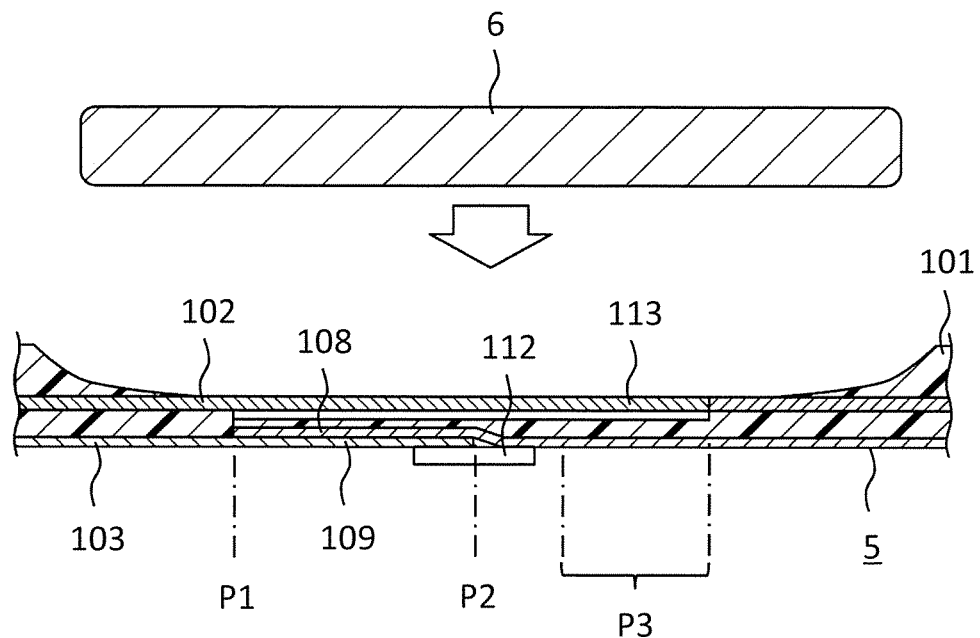
FIG. 15 is a sectional view for illustrating a state in which a resin sheet is arranged on the elongated member for a moving handrail of FIG. 14.

After that, as illustrated in FIG. 6, a resin sheet-arranging step is performed in Step S4. FIG. 15 is a sectional view for illustrating a state in which the resin sheet 112 is arranged on the elongated member 5 for a moving handrail of FIG. 14. First, the resin sheet 112 is arranged on the fabric 103 so that the fabric 103 is sandwiched between the handrail main body portion 101 and the resin sheet 112. Thus, the end portion of the overlapping portion 109 is covered with the resin sheet 112. In other words, the boundary portion 111 is covered with the resin sheet 112.

An example of a method of bonding the resin sheet 112 to the fabric 103 is a method including: heating the resin sheet 112 in advance; and bonding the resin sheet 112 to the fabric 103 under a state in which the resin sheet 112 is sufficiently softened. Another example of the method of bonding the resin sheet 112 to the fabric 103 is a method including: heating the resin sheet 112 with a heating apparatus under a state in which the resin sheet 112 is mounted on the fabric to sufficiently soften the resin sheet 112; and bonding the resin sheet 112 to the fabric 103. The method of bonding the resin sheet 112 to the fabric 103 is not limited thereto as long as the method does not facilitate the peeling of the resin sheet 112 from the fabric 103.

After that, as illustrated in FIG. 6, a resin-replenishing step is performed in Step S5. As illustrated in FIG. 15, a replenishing resin 6 is added to the region from which a portion of the handrail main body portion 101 in the front side of each of the joining portion P1 of the handrail main body portion 101, the joining portion P2 of the fabric 103, and the joining portion P3 of the tension member 102 has been removed. The replenishing resin 6 includes the same material as that of the handrail main body portion 101.

Figure 16:
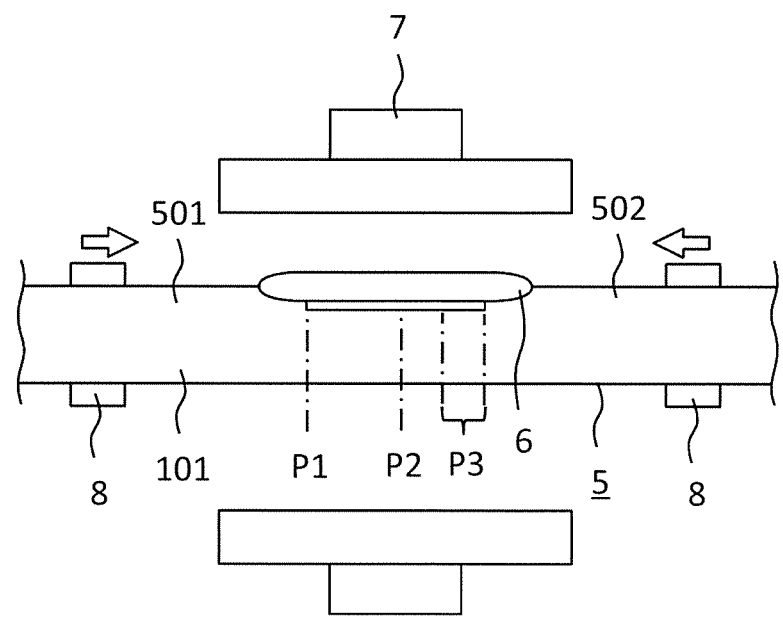
FIG. 16 is a side view for illustrating a manner in which the replenishing resin of FIG. 15 and the elongated member for a moving handrail having mounted thereon the replenishing resin are pressurized and heated.

FIG. 16 is a side view for illustrating a manner in which the replenishing resin 6 of FIG. 15 and the elongated member 5 for a moving handrail having mounted thereon the replenishing resin 6 are pressurized and heated. After that, as illustrated in FIG. 6, a hot pressing step is performed in Step S6. In the hot pressing step, the replenishing resin 6 and the elongated member 5 for a moving handrail having mounted thereon the replenishing resin 6 are pressurized and heated with a hot press apparatus 7. The hot press apparatus 7 covers the replenishing resin 6 and a portion of the elongated member 5 for a moving handrail having mounted thereon the replenishing resin 6. In addition, the hot press apparatus 7 covers a portion around the portion of the elongated member 5 for a moving handrail having mounted thereon the replenishing resin 6.

Figure 17:
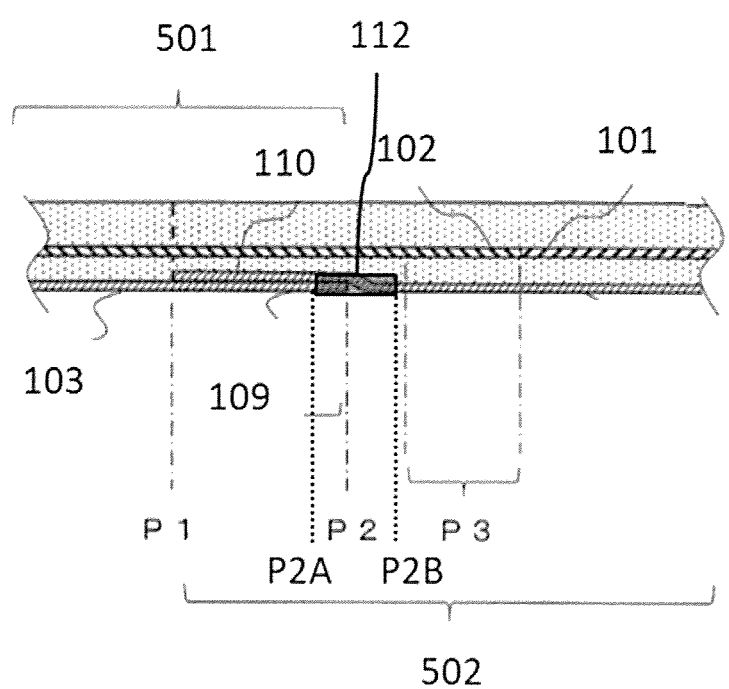
FIG. 17 is a sectional view for illustrating the one end portion in the longitudinal direction and the other end portion in the longitudinal direction of the moving handrail after the performance of a hot pressing step.

In addition, the one end portion 501 in the longitudinal direction and the other end portion 502 in the longitudinal direction are pressurized with clampers 8 in such a direction as to approach each other. The pressurization and the heating with the hot press apparatus 7 are performed under a state in which the pressurization with the clampers 8 is performed. After the pressurization and the heating with the hot press apparatus 7 have been started, the pressurization with the clampers 8 is released. In addition, some specifications of the hot press apparatus 7 may eliminate the need for the clampers 8. FIG. 17 is a sectional view for illustrating the one end portion 501 in the longitudinal direction and the other end portion 502 in the longitudinal direction of the moving handrail LA after the performance of the hot pressing step. In the hot pressing step, the one end portion 501 in the longitudinal direction and the other end portion 502 in the longitudinal direction of the one elongated member 5 for a moving handrail are joined to each other. The gap of the boundary portion 111 formed between the fabric 103 and the resin sheet 112 in the resin sheet-arranging step is filled with part of the resin sheet 112 in the hot pressing step. Accordingly, the gap of the boundary portion 111 is eliminated by the hot pressing step. Thus, the manufacture of the moving handrail 1A is completed. The timing at which the resin sheet 112 is bonded to the fabric 103 may be before the pressurization and the heating with the hot press apparatus 7, or may be after the pressurization and the heating. In addition, the resin sheet 112 may be bonded to the fabric 103 by utilizing the pressurization and the heating with the hot press apparatus 7.

As described above, according to the moving handrail LA according to the first embodiment of the present invention, the surface of the fabric 103 facing the handrail guide 4 has formed thereon the boundary portion 111 in which the end portion of the fabric 103 in the handrail longitudinal direction is arranged. The boundary portion 111 is covered with the resin sheet 112. Thus, the end portion of the fabric 103 in the handrail longitudinal direction is prevented from being exposed. Accordingly, the driving member configured to drive the moving handrail 1A is prevented from being brought into contact with the end portion of the fabric 103. As a result, the lifetime of the moving handrail 1A can be lengthened. In addition, when the end portion of the fabric 103 is prevented from being brought into contact with the driving member, an allophone can be suppressed from occurring. In addition, when the end portion of the fabric 103 is prevented from being brought into contact with the driving member, the end portion of the fabric 103 is prevented from peeling from the handrail main body portion 101. As a result, the emergency stop of the escalator apparatus caused by the peeling of the fabric 103 can be suppressed from occurring.

In addition, the boundary portion 111 has arranged therein the end portion of the overlapping portion 109 in the handrail longitudinal direction. Thus, the overlapping portion 109 is prevented from peeling from the overlapping target portion 108.

In addition, the size of the resin sheet 112 in its thickness direction is smaller than the size of a gap between the fabric 103 and the handrail guide 4. Thus, a frictional force occurring between the resin sheet 112 and the handrail guide 4 can be reduced.

In addition, the resin for forming the resin sheet 112 is identical to the resin for forming the handrail main body portion 101. Thus, the resin sheet 112 can be easily formed.

In addition, according to the method of manufacturing the moving handrail according to the first embodiment of the present invention, in the resin sheet-arranging step, the boundary portion 111 is covered with the resin sheet 112. Thus, the end portion of the fabric 103 in the handrail longitudinal direction is prevented from being exposed. Accordingly, the driving member configured to drive the moving handrail 1A is prevented from being brought into contact with the end portion of the fabric 103. As a result, the lifetime of the moving handrail 1A can be lengthened.

In addition, in the resin sheet-arranging step, after the softening of the resin sheet 112 by the heating of the resin sheet 112, the resin sheet 112 is bonded to the fabric 103 so that the boundary portion 111 is covered with the resin sheet 112. Thus, the resin sheet 112 can be easily bonded to the fabric 103.

In addition, in the resin sheet-arranging step, after the covering of the boundary portion 111 with the resin sheet 112, the resin sheet 112 is softened by the heating of the resin sheet 112, and the resin sheet 112 is bonded to the fabric 103. Thus, the resin sheet 112 can be easily bonded to the fabric 103.

Second Embodiment

Figure 18:
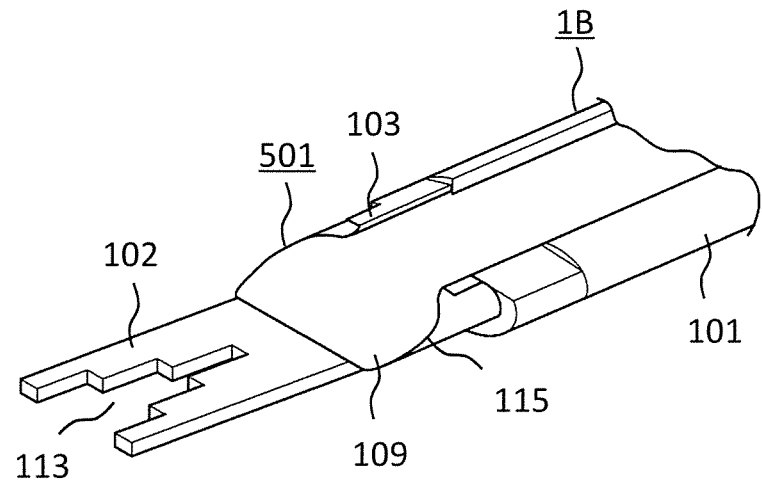
FIG. 18 is a perspective view for illustrating one end portion in a longitudinal direction of an elongated member for a moving handrail for forming a moving handrail according to a second embodiment of the present invention.

FIG. 18 is a perspective view for illustrating one end portion in a longitudinal direction of an elongated member for a moving handrail for forming a moving handrail according to a second embodiment of the present invention. In a moving handrail 1B, the shape of the overlapping portion 109 of the one end portion 501 in the longitudinal direction of the elongated member 5 for a moving handrail is different from that of the moving handrail 1A of the first embodiment. The tip portion of the overlapping portion 109 has formed therein an inclined portion 115. The inclined portion 115 is formed so as to be inclined with respect to a surface extending in the thickness direction of the moving handrail 1B when viewed from the width direction of the moving handrail 1B. Specifically, the inclined portion 115 is formed so that the front-side portion of the inclined portion 115 extends from the handrail main body portion 101 toward its tip in the longitudinal direction more than the back-side portion of the inclined portion 115 does. The other configuration is the same as that of the first embodiment.

As described above, according to the moving handrail 1B according to the second embodiment of the present invention, as in the moving handrail 1A according to the first embodiment, the lifetime of the moving handrail 1B can be lengthened.

Figure 19:
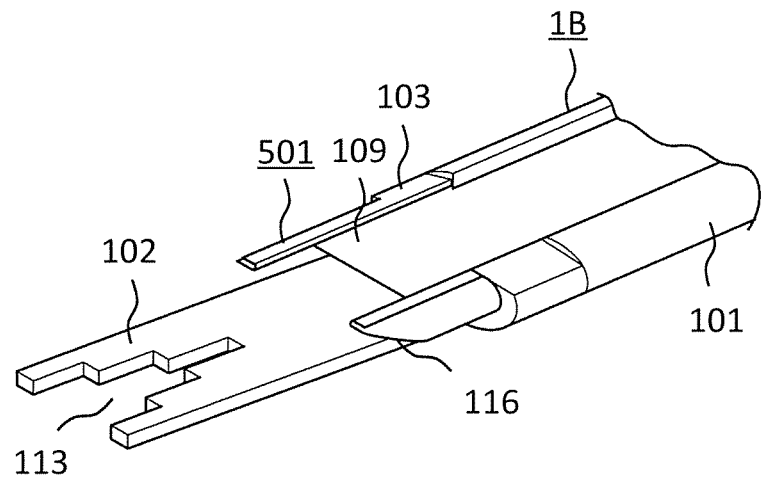
FIG. 19 is a perspective view for illustrating a modification of the one end portion in the longitudinal direction of FIG. 18.

In the above-mentioned second embodiment, a configuration in which the inclined portion 115 is formed so that the front-side portion of the inclined portion 115 extends from the handrail main body portion 101 toward the tip in the longitudinal direction more than the back-side portion of the inclined portion 115 does has been described. However, a configuration in which an inclined portion 116 is formed so that the back-side portion of the inclined portion 116 extends from the handrail main body portion 101 toward the tip in the longitudinal direction more than the front-side portion of the inclined portion 116 does as illustrated in FIG. 19 is also permitted.

In addition, the shape of the overlapping portion 109 may be any one of shapes, such as a wavy shape, a concave-convex shape, and a semicircular shape, as long as a reduction in lifetime of the moving handrail 1B and the function lack of the moving handrail 1B do not occur.

Third Embodiment

Figure 20:
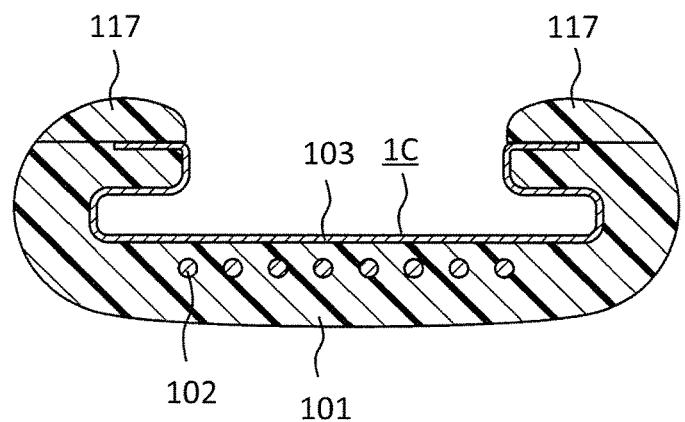
FIG. 20 is a sectional view for illustrating a moving handrail according to a third embodiment of the present invention.
Figure 21:
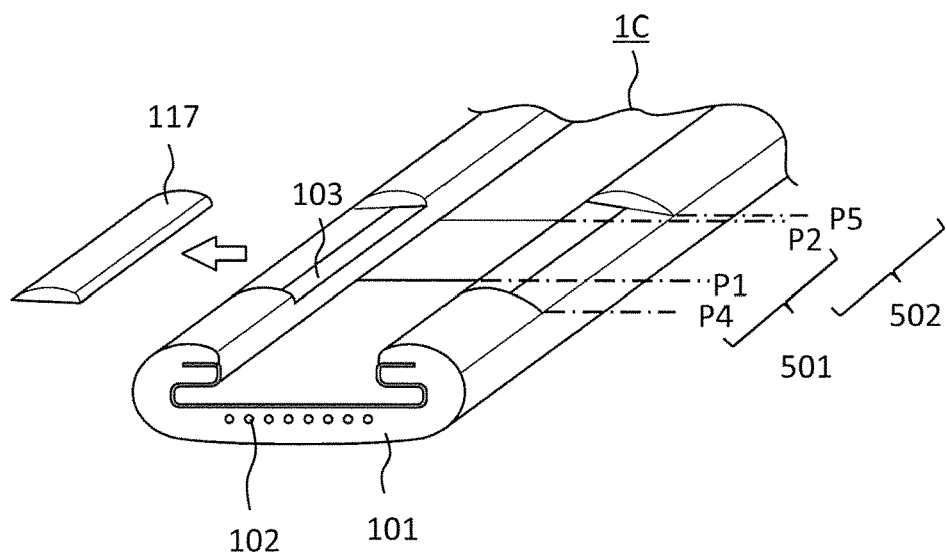
FIG. 21 is a perspective view for illustrating a procedure in which the moving handrail of FIG. 20 is manufactured.
Figure 22:
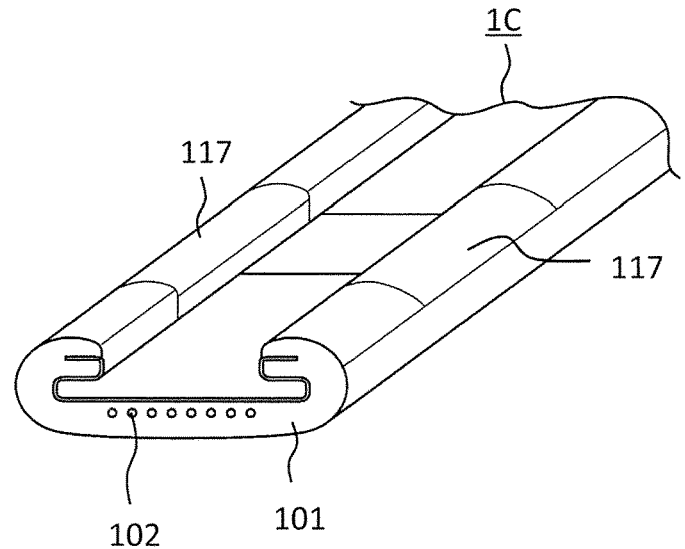
FIG. 22 is a perspective view for illustrating a state in which the covering resins of FIG. 21 are placed on the elongated member for a moving handrail.

FIG. 20 is a sectional view for illustrating a moving handrail according to a third embodiment of the present invention. FIG. 21 is a perspective view for illustrating a procedure in which the moving handrail of FIG. 20 is manufactured. FIG. 22 is a perspective view for illustrating a state in which the covering resins 117 of FIG. 21 are placed on the elongated member 5 for a moving handrail. In a moving handrail 1C, the covering resins 117 that are back-side portions of the handrail main body portion 101 in the elongated member 5 for a moving handrail are removed. Regions where the covering resins 117 are removed from the elongated member 5 for a moving handrail each include the overlapping target portion 108. After that, the one end portion 501 in the longitudinal direction and the other end portion 502 in the longitudinal direction are joined to each other. The joining portions P4 and P5 of the covering resins 117, the joining portion P1 of the handrail main body portion 101, the joining portion P2 of the fabric 103, and the joining portion P3 of the tension member 102 are arranged in the handrail longitudinal direction so as to shift from each other.

After that, as illustrated in FIG. 22, the covering resins 117 are placed on the regions of the elongated member 5 for a moving handrail from which the covering resins 117 have been removed. The other configuration is the same as that of the first embodiment or the second embodiment.

As described above, according to the moving handrail 1C according to the third embodiment of the present invention, as in the first embodiment and the second embodiment, the lifetime of the moving handrail 1C can be lengthened. In addition, the joining portions P4 and P5 of the covering resins 117, the joining portion P1 of the handrail main body portion 101, the joining portion P2 of the fabric 103, and the joining portion P3 of the tension member 102 are arranged in the handrail longitudinal direction so as to shift from each other. Thus, bending stresses are avoided from simultaneously acting on the joining portions of the covering resins 117, the joining portion P1 of the handrail main body portion 101, the joining portion P2 of the fabric 103, and the joining portion P3 of the tension member 102.

Fourth Embodiment

Figure 23:
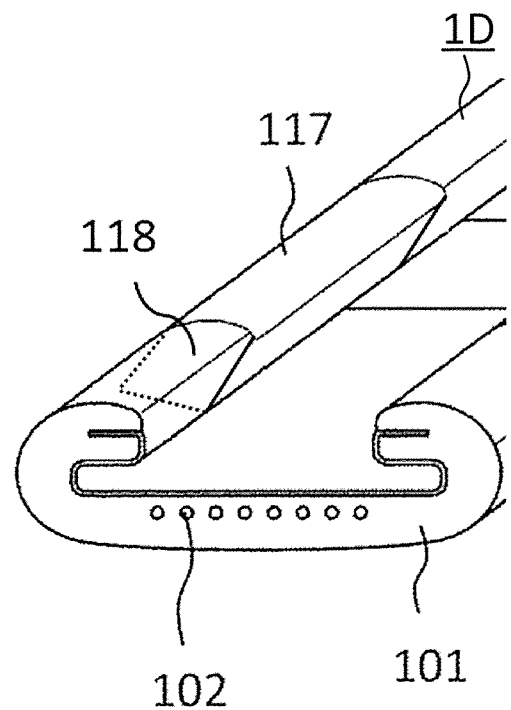
FIG. 23 is a perspective view for illustrating a moving handrail according to a fourth embodiment of the present invention.

FIG. 23 is a perspective view for illustrating a moving handrail according to a fourth embodiment of the present invention. As illustrated in FIG. 21, in the moving handrail 1C of the third embodiment, the end surfaces of the covering resins 117 in the handrail longitudinal direction are parallel to the cut surface of the elongated member 5 for a moving handrail. In other words, the end surfaces of the covering resins 117 in the handrail longitudinal direction are surfaces perpendicular to the handrail longitudinal direction. As illustrated in FIG. 22, in the third embodiment, in the hot pressing step, the joining portion P4 and the joining portion P5 between the end surfaces of each of the covering resins 117 and the region of the elongated member 5 for a moving handrail from which the covering resin 117 has been removed are fused to each other.

Meanwhile, in a moving handrail 1D according to the fourth embodiment, the end surfaces 118 of the covering resins 117 in the handrail longitudinal direction are inclined with respect to the cut surface of the elongated member 5 for a moving handrail. In other words, the end surfaces 118 of the covering resins 117 in the handrail longitudinal direction are inclined with respect to the surface perpendicular to the handrail longitudinal direction. After the arrangement of the covering resins 117 having the inclined end surfaces 118 on the regions of the elongated member 5 for a moving handrail from which the covering resins 117 have been removed, the resins and the regions are fused to each other in the hot pressing step. Thus, the fusion areas of resin molecules between the covering resins 117 and the regions of the elongated member 5 for a moving handrail from which the covering resins 117 have been removed become larger. The other configuration is the same as those of the first embodiment to the third embodiment.

As described above, according to the moving handrail 1D according to the fourth embodiment, the end surfaces 118 of the covering resins 117 in the handrail longitudinal direction are inclined with respect to the surface perpendicular to the handrail longitudinal direction. Thus, the fusion areas of the resin molecules between the covering resins 117 and the regions of the elongated member 5 for a moving handrail from which the covering resins 117 have been removed can be made larger as compared to those in the case where the end surfaces of the covering resins 117 in the handrail longitudinal direction are surfaces perpendicular to the handrail longitudinal direction. When the fusion areas of the resin molecules become larger, peeling and cracking in the joining portion P4 and the joining portion P5 can be suppressed from occurring. In addition, the time when the peeling and the cracking in the joining portion P4 and the joining portion P5 occur can be delayed. As a result, a lengthening effect on the product lifetime of the moving handrail 1D can be obtained. The sectional shapes of the end surfaces 118 of the covering resins 117 are not limited to shapes inclined with respect to the surface perpendicular to the handrail longitudinal direction, and only need to be such shapes that the fusion areas of the resin molecules become larger. For example, the shapes may be concave-convex shapes.

Fifth Embodiment

Figure 24:
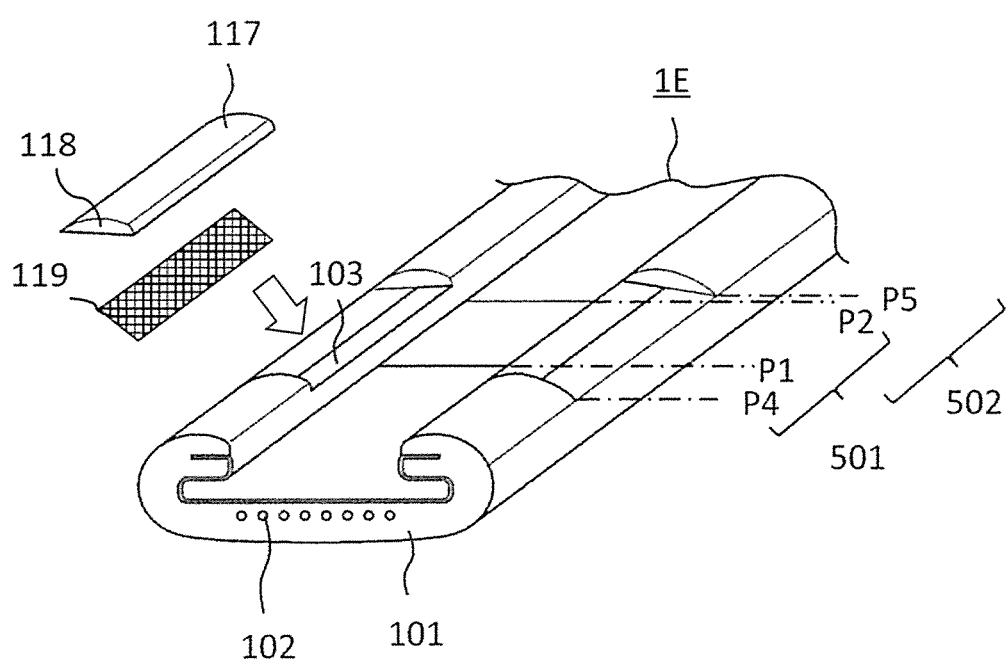
FIG. 24 is a perspective view for illustrating a moving handrail according to a fifth embodiment of the present invention.

FIG. 24 is a perspective view for illustrating a moving handrail according to a fifth embodiment of the present invention. As illustrated in FIG. 22, in the moving handrail 1C of the third embodiment, in the hot pressing step, the joining portion P4 and the joining portion P5 between the end surfaces of each of the covering resins 117 and the region of the elongated member 5 for a moving handrail from which the covering resin 117 has been removed are fused to each other.

Meanwhile, in a moving handrail 1E according to the fifth embodiment, a bonding resin 119 is arranged between each of the covering resins 117 and the fabric 103. In FIG. 24, the moving handrail 1E to be subjected to the resin-replenishing step is illustrated. In the resin-replenishing step, the bonding resin 119 is sandwiched between the covering resin 117 and the fabric 103. In the hot pressing step to be performed after the resin-replenishing step, the covering resin 117 and the fabric 103 are bonded to each other. When the covering resin 117 and the fabric 103 are bonded to each other, the arrangement of the bonding resin 119 between the covering resin 117 and the fabric 103 improves an adhesive strength between the covering resin 117 and the fabric 103. The same resin as a material for forming the moving handrail 1E or a resin having a molecular structure similar to that of the material is desirable as a material for forming the bonding resin 119. An example of the material for forming the bonding resin 119 is a single thermoplastic elastomer, such as a polyurethane-, polystyrene-, or polyolefin-based thermoplastic elastomer. Another example of the material for forming the bonding resin 119 is a thermoplastic elastomer obtained by mixing two or more kinds of the single thermoplastic elastomers, such as the polyurethane-, polystyrene-, and polyolefin-based thermoplastic elastomers. The other configuration is the same as those of the first embodiment to the fourth embodiment.

As described above, according to the moving handrail 1E according to the fifth embodiment, the bonding resin 119 is arranged between each of the covering resins 117 and the fabric 103. Thus, the adhesive strength between the covering resin 117 and the fabric 103 can be improved as compared to that in the case where the bonding resin 119 is not arranged between the covering resin 117 and the fabric 103. An improvement in adhesive strength between the covering resin 117 and the fabric 103 can suppress the peeling of the covering resin 117 from the fabric 103. Thus, a lengthening effect on the product lifetime of the moving handrail 1E can be obtained.

The fifth embodiment may be applied in combination with any one of the first to fourth embodiments, and in any case, a lengthening effect on the product lifetime of the moving handrail is obtained.

REFERENCE SIGNS LIST 1A, 1B, 1C, 1D, 1E moving handrail, 2 lower floor-side entrance, 3 upper floor-side entrance, 4 handrail guide, 5 elongated member for moving handrail, 6 replenishing resin, 7 hot press apparatus, 8 clamper, 101 handrail main body portion, 102 tension member, 103 fabric, 104 design surface, 105 guide surface, 106 joining surface, 107 joining surface, 108 overlapping target portion, 109 overlapping portion, 110 overlapping region, 111 boundary portion, 112 resin sheet, 113 step portion, 114 step portion, 115 inclined portion, 116 inclined portion, 117 covering resin, 118 end surface, 119 bonding resin, 501 one end portion in longitudinal direction, 502 other end portion in longitudinal direction.

The invention claimed is:

1. A moving handrail, comprising:
a handrail main body portion;
a fabric arranged on a guide surface of the handrail main body portion and extending in a handrail longitudinal direction that is a direction along the handrail main body portion; and
a resin sheet arranged on the fabric so that the fabric is sandwiched between the handrail main body portion and the resin sheet,
wherein a surface of the fabric facing a handrail guide has arranged thereon an end portion of the fabric in the handrail longitudinal direction, and
wherein the end portion is covered with the resin sheet, and is embedded in part of the resin sheet.

2. The moving handrail according to claim 1,
wherein the fabric includes
an overlapping target portion, and
an overlapping portion caused to overlap a surface of the overlapping target portion on the handrail guide side, and
wherein the end portion of the fabric in the handrail longitudinal direction is an end portion of the overlapping portion in the handrail longitudinal direction.

3. The moving handrail according to claim 1, wherein a size of the resin sheet in a thickness direction is smaller than a size of a gap between the fabric and the handrail guide.

4. The moving handrail according to claim 1, wherein a resin for forming the resin sheet is identical to a resin for forming the handrail main body portion.

5. A method of manufacturing a moving handrail, comprising:
a resin sheet-arranging step of arranging a resin sheet on a fabric arranged on a guide surface of a handrail main body portion and extending in a handrail longitudinal direction that is a direction along the handrail main body portion so that the fabric is sandwiched between the handrail main body portion and the resin sheet; and
a hot pressing step of joining one end portion in a longitudinal direction and the other end portion in the longitudinal direction of one elongated member for a moving handrail including the handrail main body portion and the fabric to each other after the resin sheet-arranging step,
wherein a surface of the fabric facing a handrail guide has arranged thereon an end portion of the fabric in the handrail longitudinal direction, and
wherein the end portion is covered with the resin sheet, and in the hot pressing step, the end portion is embedded in part of the resin sheet.

6. The method of manufacturing a moving handrail according to claim 5,
wherein the fabric includes
an overlapping target portion, and
an overlapping portion caused to overlap a surface of the overlapping target portion on the handrail guide side, and
wherein the end portion of the fabric in the handrail longitudinal direction is an end portion of the overlapping portion in the handrail longitudinal direction.

7. The method of manufacturing a moving handrail according to claim 5, wherein in the resin sheet-arranging step, after softening of the resin sheet by heating of the resin sheet, the resin sheet is bonded to the fabric so that the end portion is covered with the resin sheet.

8. The method of manufacturing a moving handrail according to claim 5, wherein in the resin sheet-arranging step, after covering of the end portion with the resin sheet, the resin sheet is softened by heating of the resin sheet, and the resin sheet is bonded to the fabric.

9. The method of manufacturing a moving handrail according to claim 5, wherein in the hot pressing step, the one end portion in the longitudinal direction and the other end portion in the longitudinal direction are joined to each other in the end portion, and a boundary portion between the one end portion in the longitudinal direction and the other end portion in the longitudinal direction is filled with part of the resin sheet.

* * * * *